United States Patent

[11] 3,612,540

[72] Inventor Justin L. Turner
Branford, Conn.

[21] Appl. No. 775,481
[22] Filed Nov. 13, 1968
[45] Patented Oct. 12, 1971
[73] Assignee Message Systems, Inc.
New Haven, Conn.

[54] TAPE DECK USING ENDLESS TAPE CARTRIDGE
12 Claims, 5 Drawing Figs.

[52] U.S. Cl. .......... 274/4 B, 179/100.2 CA, 179/100.2 Z, 226/196, 242/55.19 A, 242/76
[51] Int. Cl. .......... G11b23/06, B65h 27/00
[50] Field of Search .......... 179/100.2 CA, 100.2 MI, 100.2 Z; 242/76, 55.19, 55.19 A; 226/199, 196; 352/128; 279/4; 274/4 B, 4 D, 11 B, 11 D

[56] References Cited

UNITED STATES PATENTS

| | | | |
|---|---|---|---|
| 2,526,377 | 10/1950 | London | 242/55.19 |
| 2,530,936 | 11/1950 | Bohl, Jr. | 242/55.19 |
| 2,678,971 | 5/1954 | Barany | 179/100.2 |
| 2,916,728 | 12/1959 | Gilson | 179/100.2 |
| 2,921,787 | 1/1960 | Cousino | 179/100.2 |
| 3,204,845 | 9/1965 | Griffiths | 226/199 |
| 3,276,651 | 10/1966 | Bryer | 242/76 |
| 3,311,316 | 3/1967 | Williams | 179/100.2 |
| 3,326,484 | 6/1967 | Yefsky | 242/55.19 |
| 3,388,844 | 6/1968 | Naoji Tamura | 226/20 |

*Primary Examiner*—James W. Moffitt
*Attorney*—McCormick, Paulding & Huber

ABSTRACT: A tape deck for use with an endless tape cartridge comprises a means for mounting a cartridge to a deck plate and a means for guiding the external portion of the tape in a simple path parallel to the plane of the deck plate past one or more pickup heads and a driving capstan. The guide means includes two guide posts mounted on a separate mounting plate together with the pickup heads which are located therebetween. A third guide post is located between the trailing one of the first two posts and the entrance opening of the cartridge and a directly driven capstan for driving the tape is located between the latter two posts. The tape cartridge is mounted on the deck plate in a tilted fashion to cooperate with the guide posts in providing a planar path of travel for the entire external loop of the tape.

PATENTED OCT 12 1971 3,612,540

INVENTOR.
JUSTIN L. TURNER
BY
McCormick, Paulding & Huber
ATTORNEYS

TAPE DECK USING ENDLESS TAPE CARTRIDGE

BACKGROUND OF THE INVENTION

This invention relates to tape recorders, and deals more particularly with a tape deck for use with an endless tape cartridge so as to be capable of being continuously operated to repeatedly reproduce the program or programs recorded on the tape of the cartridge.

The tape deck of this invention may be put to many different uses, but is particularly intended for applications wherein it is desired to repeatedly reproduce one or more relatively short recorded programs over long periods of time. Such an application, for example, may involve a museum tour or lecture system wherein short lectures, background sounds or other audible information is transmitted from various transmitters located near various exhibits for reception by suitable receivers carried by visitors and delivered in audible form to the visitor through an earphone or the like worn by the visitor. In such a system the same message or program is repeatedly transmitted from a given exhibit and may be picked up by any receiver equipped visitor standing within a given boundary around the exhibit. Throughout the museum various different programs are transmitted simultaneously with the field of each transmitted program being adjusted so as not to interfere with that of another program, and as a visitor moves from one active exhibit to another he picks up the programs associated with each such exhibit. The tape deck of this invention lends itself well to this application in that it is capable of long continuous operation and is also capable of use with a tape having a large number of separate channels with separate programs recorded thereon, the deck therefore being capable of servicing an equally large number of exhibits.

In addition to providing a tape deck capable of long continuous service and for use with a large number of tape channels, other objects of the invention are to provide a tape deck of the foregoing character wherein tape cartridges may be readily changed, which is fairly economical to manufacture and which includes few moving parts. Another important object is to provide a tape deck of the foregoing character wherein the pickup head may be accurately adjusted relative to the associated tape guides prior to final assembly to assure proper registry between the tape channels and the pickup head poles, and wherein the pickup heads and associated guides are part of a prealignable subassembly permitting simple field servicing by replacement of such subassembly.

SUMMARY OF THE INVENTION

This invention resides in a tape deck for use with an endless tape cartridge including a quantity of endless tape and a case having exit and entrance openings through which the tape extends to form an external loop. The external tape loop is guided in an external path by two guides each including two spaced shoulders for engaging opposite edges of the tape to prevent lateral shifting. The tape passes from the exit opening of the case to the first guide, passes around the first guide for a substantial angular distance, passes around the second guide for another substantial angular distance and then extends back toward the entrance opening of the case. The pickup head or heads are located between these two guides and have pole faces located beyond the line along which the tape otherwise passes so as to engage and bow the tape away from said line to thereby hold the tape in close contact with the poles of the heads. A third guide is located close to the entrance opening of the case. A directly driven capstan engages the tape between the second and third guides and cooperates with a pressure wheel for driving the tape. The tape cartridge is tilted to bring the bottom edges of its exit and entrance openings into the plane defined by corresponding shoulders of the guides and thereby provides the entire extent of the external tape loop with a planar path. The first two guides and the pickup head or heads are mounted on a separate mounting plate removably attached to the deck plate so that the head or heads may be prealigned relative to such guides prior to final assembly of the tape deck to obtain proper positioning of each pickup pole relative to the tape passing thereby.

DESCRIPTION OF THE PREFERRED EMBODIMENT

Figure 1:
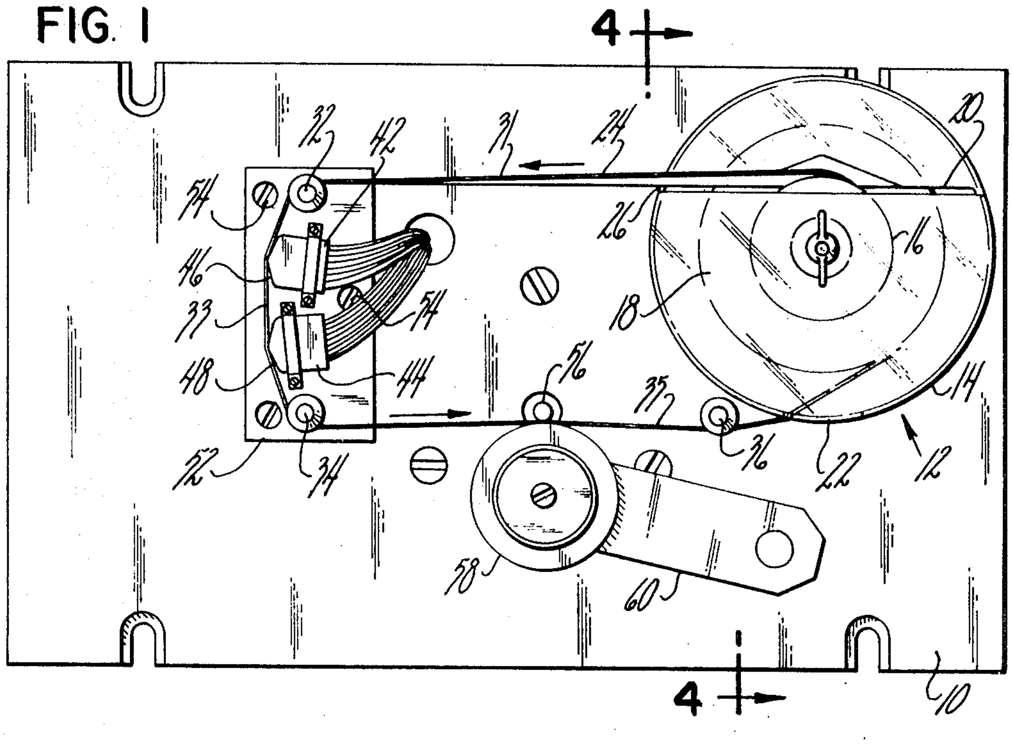
FIG. 1 is a plan view of a tape deck embodying this invention.
Figures 2, 3, 5:
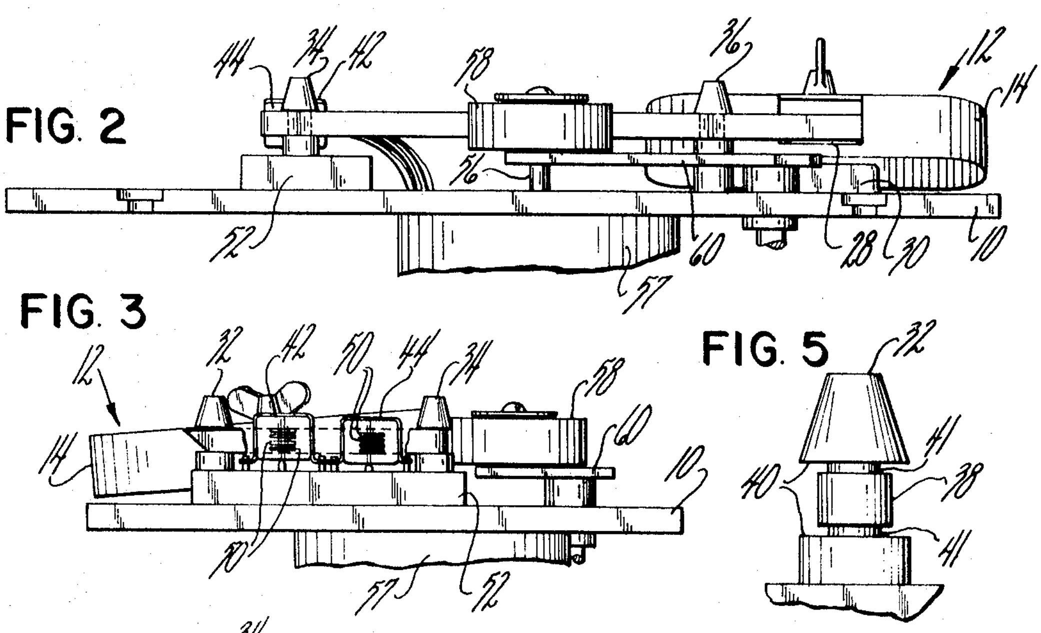
FIG. 2 is a side elevational view of the tape deck of FIG. 1.
FIG. 3 is an end view of the tape deck of FIG. 1 taken looking toward the right in FIG. 1 and with part of the tape being shown broken away to disclose the locations of the poles on the pickup heads.
FIG. 5 is an elevational view of one of the guide posts of FIG. 1.

Referring to the drawings, a tape deck embodying this invention is shown therein as comprising a main deck plate 10 on which other components are mounted and itself adapted for mounting in a cabinet, case or other supporting structure along with associated equipment, The tape deck is adapted for use with an endless tape cartridge indicated generally at 12. The cartridge 12 is of a commercially available type and may, for example, be of the type sold under the name "Cousino Audio Vendor" by Orrtronics, Inc. of Toledo, Ohio. It includes a case 14 which supports a rotatable member including a spool portion 16 on which a quantity of tape, indicated at 18, is wound. The case 14 further includes an exit opening in the form of a slot 20 located in the upper portion of the case and an entrance opening 22 located in the sidewall of the case. An external loop 24 of tape passes from the exit slot 20 through the entrance opening 22, the tape moving in the direction of the arrows in FIG. 1 during normal operation. As a point on the tape is moved from the exit opening to the entrance opening, tape is pulled from adjacent the surface of the spool portion 16 and passes over one side of the wound portion 18 of the tape, which is referred to as the upper side and is the side facing the viewer in FIG. 1. The bottom edge 26 of the exit slot 20 is therefore located generally in the plane of the upper side of the wound portion 18 of the tape. On the other hand, the tape which moves back onto the wound portion 18 through the entrance opening 22 moves over the outer periphery of the portion 18 and, therefore, the bottom edge 28 of the entrance opening, shown in FIG. 2, is located generally in the plane of the lower or opposite side of the wound portion 18 of the tape. Accordingly, the bottom edges 26 and 28 of the exit and entrance openings of the cartridge case 14 are at different levels of the case and, in the past, this difference has caused some difficulty in obtaining proper tracking of the external tape loop, particularly in cases where precise tracking is necessary because of a large number of side-by-side channels recorded on the tape.

Figure 4:
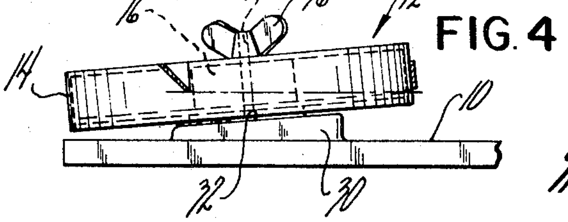
FIG. 4 is a vertical sectional view taken on the line 4—4 of FIG. 1.

To overcome this problem of different levels for the exit and entrance openings of the cartridge case, the cartridge is mounted to the deck place 10 by a means which tilts the case 14 a proper amount to bring the bottom edges 26 and 28 of the two openings to the same height relative to the plane of the deck plate, and guide means, as hereinafter described, are provided for guiding the external portion of the tape in a planar path located in a plane parallel to the plane of the deck plate. The mounting means for the tape cartridge consists, as best shown in FIG. 4, of a block 30 fixed to the deck plate 10 and having an inclined upper surface 32 for engaging the bottom surface of the cartridge 12 and imparting the desired degree of tilt thereto. A post 34 is fixed to the block 30 and extends upwardly perpendicular to the surface 32. The post 34 is formed to conform to the center opening of the cartridge 14 and is threaded at its outer end to receiver a wing nut 36 or other similar threaded retaining device for releasably holding the cartridge 12 to the block 30 and deck plate 10. Therefore, by simply removing the wing nut 36, the cartridge 14 may be readily removed from the tape deck and replaced by another one.

The means for guiding and external loop 24 of the tape consists of three guides 32, 34 and 36 located at fixed points relative to the deck plate 10 and each consisting of a stationary guide post. All three of the posts are of substantially similar shape as shown by FIG. 5 which illustrates the shape of the guide post 32 with the tape removed therefrom. As shown in this figure the post is of a cylindrical shape and includes a reduced diameter portion around which the tape passes defined by two spaced shoulders 40, 40. These two shoulders are spaced from one another by a distance very closely equal to the width of the tape so that they engage opposite side edges of the tape to prevent lateral shifting thereof. A relief groove 41 is preferably provided at the base of each shoulder 40 to eliminate the possibility of any rounded corner which would cause excessive wear of the tape edge.

The first guide post 32 is locates so that the tape in passing from the exit slot 20 forms a straight leg 31 aligned with the slot 20. The third post 36 is located relatively close to the entrance opening 22. The second guide post 34 is located generally at the intersection of a first line passing through the post 32 perpendicular to the leg 31 and a second line passing through the post 36 parallel to the leg 31. The three guide posts 32, 34 and 36 therefore define, in addition to the first leg 31, two others legs 33 and 35 extending generally perpendicular to one another with the tape, except for the outward bowing thereof caused by the presence of the pickup heads, passing approximately 90° around each of the first two guide posts 32 and 34.

Between the first two guide posts 32 and 34, and along the tape leg 33, are two pickup heads 42 and 44, having pole faces 46 and 48, respectively, so located that the tape in passing between the guide posts 32 and 34 is engaged by the pole faces and bowed outwardly from the line it would otherwise follow so as to be held in close contact with the poles of the pole faces. The number of poles provided on each recording head may vary, but, as shown in FIG. 3, each pickup head preferably includes four poles 50, 50 each used for retrieving information recorded on a separate associated channel of the tape, for a total of eight poles or eight channels. The poles 50, 50 of each pickup head are spaced from one another and the two pickup heads are so arranged that the poles 50, 50 of one pickup head are laterally staggered relative to the poles 50, 50 of the other pickup head so as to be capable of retrieving information from eight side-by-side channels on the tape. This large number of channels requires that the tape be accurately guided past the pickup heads to avoid crosstalk, and this accurate guiding is provided by the shoulders 40, 40 of the guide posts 32, 34, and 36 which engage the opposite edges of the tape to prevent lateral shifting thereof and to thereby maintain each channel of the tape accurately aligned with its associated pickup head pole 50. Furthermore, the shoulders 40, 40 of the guide posts are so arranged that the three bottom shoulders of the three posts are located in a common plane passing through or in close proximity to the bottom edges 26 and 28 of the exit and entrance openings 20 and 22. Therefore, the external loop 24 of the tape extends for its entire length along a planar path parallel to the plane of the deck plate 10. There is accordingly no tendency for the tape to skew in passing the pickup heads 42 and 44, and very little or no guiding force need be applied to the edges of the tape by the various shoulders 40, 40 to maintain such path, thereby improving the tracking characteristics of the tape and reducing tape wear.

Proper alignment of the poles 50, 50 of the pickup heads 42 and 44 relative to the channels of the tape requires that the pickup heads be accurately positioned relative to the guide shoulders 40, 40 of the first two guide posts 32 and 34. Therefore, in assembling the guide posts 32 and 34 and the pickup heads 42 and 44, the pickup heads normally have to be precisely adjusted to bring them to the proper positions relative to the guide posts 32 and 34. To enable this adjustment to be made prior to the complete assembly of the tape deck, the two guide posts 32 and 34 and the two pickup heads 42 and 44 are preferably fixed to a separate mounting plate 52 removably secured to the deck plate 10 by a number of screws 54, 54 or the like. The mounting plate 52, the two guide posts 32 and 34 and the two pickup heads 42 and 44 therefore form of separate subassembly wherein the two pickup heads may be accurately aligned relative to the two posts 32 and 34 prior to the mounting of the subassembly to the deck plate. This alignment therefore can be made apart from the remainder of the tape deck prior to the final assembly. It also allows for easy repair of the tape deck by, in the case of a faulty or misaligned pickup head, allowing the entire subassembly to be removed and replaced by another prealigned subassembly, thereby eliminating the need for delicate adjustment of the pickup heads in the field.

A drive for the tape is provided by a capstan 56 located adjacent one side of the tape leg 35 extending between the guide posts 34 and 36. The capstan 56 is directly driven by an associated motor 57 and cooperates with a pressure wheel or puck 58 rotatably carried by an associated pivotal arm 60. The arm 60 is suitably biased to urge the pressure wheel 58 toward the capstan 56 so that the tape is squeezed between the capstan and the pressure wheel to drive the tape as the capstan is rotated. A solenoid or other means (not shown) may be used for moving the arm 60 against its bias to remove the pressure wheel from the capstan when changing the tape cartridge.

I claim:

1. In a tape deck the combination comprising: a deck plate, an endless tape cartridge mounted on said deck plate and including a quantity of endless tape and a case for said tape with exit and entrance openings through which said tape extends, a plurality of guides located externally of said case and at fixed points relative to said deck plate for guiding said tape in an external path from said exit opening to said entrance opening, said plurality of guides including a first guide and a second guide which are engaged firstly and secondly, respectively, by a point on said tape as said point moves from said exit opening to said entrance opening, at least one pickup head located between said first and second guides and having a pole face located beyond the line said tape would otherwise follow in passing between said first and second guides so as to engage and bow said tape away from said line, a capstan located on one side of said tape along the path said tape follows in passing from said exit opening to said entrance opening, a pressure wheel located on the opposite side of said tape from said capstan and operable to press said tape against said capstan to obtain a driving of said tape as said capstan is rotated, a mounting member removably fixed to said deck plate, said first and second guides and said pickup head being carried by and fixed to said mounting member and said first and second guides each including two spaced shoulders spaced from one another by a distance closely equal to the width of said tape and engageable with the edges of said tape to prevent lateral shifting of said tape as it passes between said first and second guides and across said pole face of said pickup head, said pickup head being spaced from both of said first and second guides and said pole face thereof in the direction laterally of said tape 2. The combination defined in claim 1 further characterized by there being two pickup heads located between said first and second guides each having a pole face with a plurality of poles spaced from one another laterally of the tape moving therepast, the poles of the first one of said heads being laterally staggered with respect to the poles of the second one of said heads.

3. In a tape deck the combination comprising: a deck plate, an endless tape cartridge mounted on said deck plate and including a quantity of endless tape and a case for said tape with exit and entrance openings through which said tape extends, only three guides located externally of said case and at fixed points relative to said deck plate for guiding said tape in an external path from said exit opening to said entrance opening, said three guides including first, second and third ones which are engaged firstly, secondly and thirdly, respectively, by a point on said tape as said point moves from said exit opening to said entrance opening, at least one pickup head located between said first and second guides and having a pole face located beyond the line said tape would otherwise follow in passing between said first and second guides so as to engage and bow said tape away from said line, said tape passing in a straight line from said second guide to said third guide, a capstan located on one side of said tape adjacent said straight line which said tape follows in passing from said second to said third guide, a pressure wheel located on the opposite side of said tape from said capstan and operable to press said tape against said capstan to obtain a driving of said tape as said capstan is rotated, and a mounting member removably fixed to said deck plate, said first and second guides and said pickup head being carried by and fixed to said mounting member and said first and second guides each including two spaced shoulders spaced from one another by a distance closely equal to the width of said tape and engageable with the edges of said tape to prevent lateral shifting of said tape as it passes between said first and second guides and across said pole face of said pickup head, said pickup head being spaced from both of said first and second guides and said pole face thereof in the direction laterally of said tape having a dimension greater than the width of said tape so that said pickup head may be moved relative to said mounting member in the direction laterally of said tape to move said pole face thereof laterally relative to said tape.

4. The combination defined in claim 3 further characterized by said first and second guide being stationary posts fixed relative to said mounting member and said third guide being stationary post fixed relative to said deck plate, said third guide also having spaced shoulders spaced from each other by a distance substantially equal to the width of said tape and engageable with the edges of said tape to prevent lateral shifting thereof as said tape moves between said second and third posts and past said capstan.

5. The combination defined in claim 3 further characterized by there being two pickup heads located between said first and second guides each having a pole face with a plurality of poles spaced from one another laterally of the tape moving therepast, the poles of the first one of said heads being laterally staggered with respect to the poles of the second one of said heads.

6. In a tape deck the combination comprising: a deck plate, an endless tape cartridge mounted on said deck plate and including a quantity of endless tape and a case for said tape with exit and entrance openings through which said tape extends, only three guides located externally of said case and at fixed points relative to said deck plate for guiding said tape in an external path from said exit opening to said entrance opening, said three guides including first, second and third ones which are engaged firstly, secondly and thirdly, respectively, by a point on said tape as said point moves from said exit opening to said entrance opening, at least one pickup head located between said first and second guides and having a pole face located beyond the line said tape would otherwise follow in passing between said first and second guides so as to engage and bow said tape away from said line, said tape passing in a straight line from said second guide to said third guide, a capstan located on one side of said tape adjacent said straight line which said tape follows in passing from said second to said third guide, and a pressure wheel located on the opposite side of said tape from said capstan and operable to press said tape against said capstan to obtain a driving of said tape as said capstan is rotated, said exit and entrance openings of said case each having a bottom edge along which one edge of said tape passes in moving therethrough, said three guides each having two spaced shoulders spaced from one another by a distance substantially equal to the width of said tape so as to prevent lateral shifting of said tape relative thereto, a corresponding one of the shoulders of each of said guide being located in a common place passing approximately through the bottom edges of said exit and entrance openings so that said tape in moving from said exit opening to said entrance opening moves through a path parallel to said plane.

7. The combination defined in claim 6 further characterized by said cartridge including a central spool portion around which a quantity of said tape is wound, said exit opening having its bottom edge located in line with one side of the wound portion of said tape and said entrance opening having its bottom edge aligned with the opposite side of said wound portion of said tape, and means for mounting said cartridge on said deck plate so that said case is tilted relative to said deck plate to bring said bottom edges of said exit and entrance openings to approximately equal heights from the plane of said deck plate.

8. In a tape deck the combination comprising: a deck plate, an endless tape cartridge mounted on said deck plate and including a quantity of endless tape and a case for said tape with exit and entrance openings through which said tape extends, only three guides located externally of said case and at fixed points relative to said deck plate for guiding said tape in an external path from said exit opening to said entrance opening, said three guides including first, second and third ones which are engaged firstly, secondly and thirdly, respectively, by a point on said tape as said point moves from said exit opening to said entrance opening, at least one pickup head located between said first and second guides and having a pole face located beyond the line said tape would otherwise follow in passing between said first and second guides so as to engage and bow said tape away from said line, said tape passing in a straight line from said second guide to said third guide, a capstan located on one side of said tape adjacent said straight line which said tape follows in passing from said second to said third guide, a pressure wheel located on the opposite side of said tape from said capstan and operable to press said tape against said capstan to obtain a driving of said tape as said capstan is rotated, said third guide being located relatively close to said entrance opening and said first and second guides being located so that said tape passes approximately 90° around each of said first and second guides, said exit and entrance openings having bottom edges located at different levels of said case, and means mounting said tape cartridge on said tape deck with said case so tilted relative to the plane of said tape deck that said bottom edges of said exit and entrance and located at approximately the same height from said plane of said tape deck, said three guides having laterally spaced shoulders for engaging opposite edges of said tape to prevent lateral shifting thereof with corresponding ones of said shoulders being located in a common plane passing approximately through the plane of said bottom edges of said exit and entrance openings so that said tape between said exit and entrance openings travels in a path parallel to the plane of said tape deck plate.

9. In a tape deck the combination comprising a deck plate, an endless tape cartridge mounted on said deck plate and including a quantity of endless tape in a case with exit and entrance openings through which said tape extends, means including at least two guides for guiding said tape in an external path from said exit opening to said entrance opening, being so arranged that said tape passes from said exit opening immediately to the first of said guides, travels partially around said guide to said second guide and travels partially around said second guide back toward said entrance opening along a path extending in substantially a straight line from said second guide to said entrance opening, at least one pickup head located between said two guides and having a pole face located beyond the line said tape would otherwise follow in moving between said two guides so as to engage and bow said tape away from said line, means for driving said tape, said exit and entrance openings of said case each having a bottom edge along which one edge of said tape passes in moving therethrough, said cartridge including a central spool portion around which a quantity of said tape is wound, said exit opening having its bottom edge located in line with one side of the wound portion of said tape and said entrance opening having its bottom edge aligned with the opposite side of said wound portion of said tape, and means for mounting said cartridge on said deck plate so that said case is tilted relative to said deck plate to bring said bottom edges of said exit and entrance openings to approximately equal heights from the plane of said deck plate, said two guides each having two spaced shoulders spaced from one another by a distance substantially equal to the width of said tape so as to prevent lateral shifting of said tape relative thereto, the bottom ones of the shoulders of each of said two guides being located in a common place passing approximately through said bottom edges of said exit and entrance openings so that said tape in moving from said exit opening to said entrance opening moves through a path parallel to said plane.

10. The combination defined in claim 9 further characterized by a mounting plate removably fixed to said deck plate, said two guides and said pickup head being carried by and fixed to said mounting plate, said pickup head being spaced from both of said first and second guides and said pole face thereof in the direction laterally of said tape having a dimension greater than the width of said tape so that said pickup head may be moved relative to said mounting member in the direction laterally of said tape to move said pole face thereof laterally

11. The combination defined in claim 9 further characterized by said two guides being so arranged that said tape passes from said exit opening immediately to the first of said guides, travels partially around said first guide to the second of said guides and travels partially around said second guide back toward said entrance opening, said means for driving said tape including a capstan located on one side of said tape adjacent the path said tape follows in passing from said second guide toward said entrance opening, and a pressure wheel located on the opposite side of said tape from said capstan and operable to press said tape against said capstan to obtain driving of said tape as said capstan is rotated.

12. The combination defined in claim 11 further characterized by said path said tape follows in moving from said second guide to said entrance opening being substantially a straight line from said second guide to said entrance opening.

PO-1050
(5/69)

UNITED STATES PATENT OFFICE
CERTIFICATE OF CORRECTION

Patent No. 3,612,540 Dated October 12, 1971

Inventor(s) Justin L. Turner

It is certified that error appears in the above-identified patent and that said Letters Patent are hereby corrected as shown below:

Col. 2, line 23, after "equipment" cancel " , " and substitute -- . --.
Col. 2, line 59, "place" should read --plate--.
Col. 3, line 3, "and" should read --the--.
Col. 3, line 19, "locates" should read --located--.
Col. 3, line 49, "crosstalk" should read --cross talk--.
Col. 4, line 7, after "two" insert --guide--.
Col. 4, line 59, after "tape" insert --having a dimension greater than the width of said tape so that said pick-up head may be moved relative to said mounting member in the direction laterally of said tape to move said pole face thereof laterally relative to said tape.--.
Col. 5, line 30, "guide" should read --guides--.
Col. 5, line 73, "guide" should read --guides--.
Col. 5, line 74, cancel "place" and substitute --plane--.
Col. 6, line 44, "and" should read --are--.
Col. 6, line 59, cancel "being so".
Col. 6, lines 60 through 64, please cancel.
Col. 6, line 65, cancel "guide to said entrance opening,".
Col. 7, line 10, "place" should read --plane--.
Col. 8, line 3, after "laterally" insert --relative to said tape.--.

Signed and sealed this 4th day of April 1972.

(SEAL)
Attest:

EDWARD M.FLETCHER,JR.
Attesting Officer

ROBERT GOTTSCHALK
Commissioner of Patents